US011090834B2

(12) United States Patent
Hirmke

(10) Patent No.: US 11,090,834 B2
(45) Date of Patent: Aug. 17, 2021

(54) METHOD FOR THE MANUFACTURE OF A WET GLUED WOOD ARTICLE

(71) Applicant: STORA ENSO OYJ, Helsinki (FI)

(72) Inventor: Markus Hirmke, Rossatz-Arnsdorf (AT)

(73) Assignee: Stora Enso OYJ, Helsinki (FI)

( * ) Notice: Subject to any disclaimer, the term of this patent is extended or adjusted under 35 U.S.C. 154(b) by 142 days.

(21) Appl. No.: 16/092,509

(22) PCT Filed: Apr. 12, 2017

(86) PCT No.: PCT/IB2017/052111
§ 371 (c)(1),
(2) Date: Oct. 10, 2018

(87) PCT Pub. No.: WO2017/178983
PCT Pub. Date: Oct. 19, 2017

(65) Prior Publication Data
US 2019/0126507 A1 May 2, 2019

(30) Foreign Application Priority Data

Apr. 15, 2016 (SE) .................................. 1650506-7

(51) Int. Cl.
*B27M 3/00* (2006.01)
*B27D 1/00* (2006.01)
(Continued)

(52) U.S. Cl.
CPC ............. *B27M 3/0053* (2013.01); *B27D 1/00* (2013.01); *B32B 3/26* (2013.01); *B32B 7/12* (2013.01);
(Continued)

(58) Field of Classification Search
CPC .... B27M 3/0053; B32B 21/04; B32B 21/042; B32B 21/13; B32B 37/06;
(Continued)

(56) References Cited

U.S. PATENT DOCUMENTS 4,239,577 A 12/1980 Brown et al.
5,626,705 A * 5/1997 Winterowd ............. C08L 61/06
156/304.5

(Continued)

FOREIGN PATENT DOCUMENTS

CA 2238491 A1 11/1999
CN 104552494 4/2015
(Continued)

OTHER PUBLICATIONS

Ammann et al. "Comparative adhesion analysis at glue joints in European beech and Norway spruce wood by means of nanoindentation" Dec. 2013.*

(Continued)

Primary Examiner — John L Goff, II
(74) Attorney, Agent, or Firm — Greer, Burns & Crain, Ltd.

(57) ABSTRACT

The present invention relates to a method for manufacturing a wet glued wood article, as well as a wet glued article obtainable by said method and also uses of a wet glued article, wherein the method comprises the following steps: a) providing two actively never-dried or slightly dried wood pieces comprising at least one surface each which has a superficial layer having a thickness of least 2-3 wood cells; b) drying said surfaces of said wood pieces so that the moisture content of said superficial layer is below the fibre saturation point, providing a dried surface on each of the said wood pieces; c) applying a gluing agent on said dried surface of one of the wood pieces, thus providing a glue (Continued)

Figure 1:
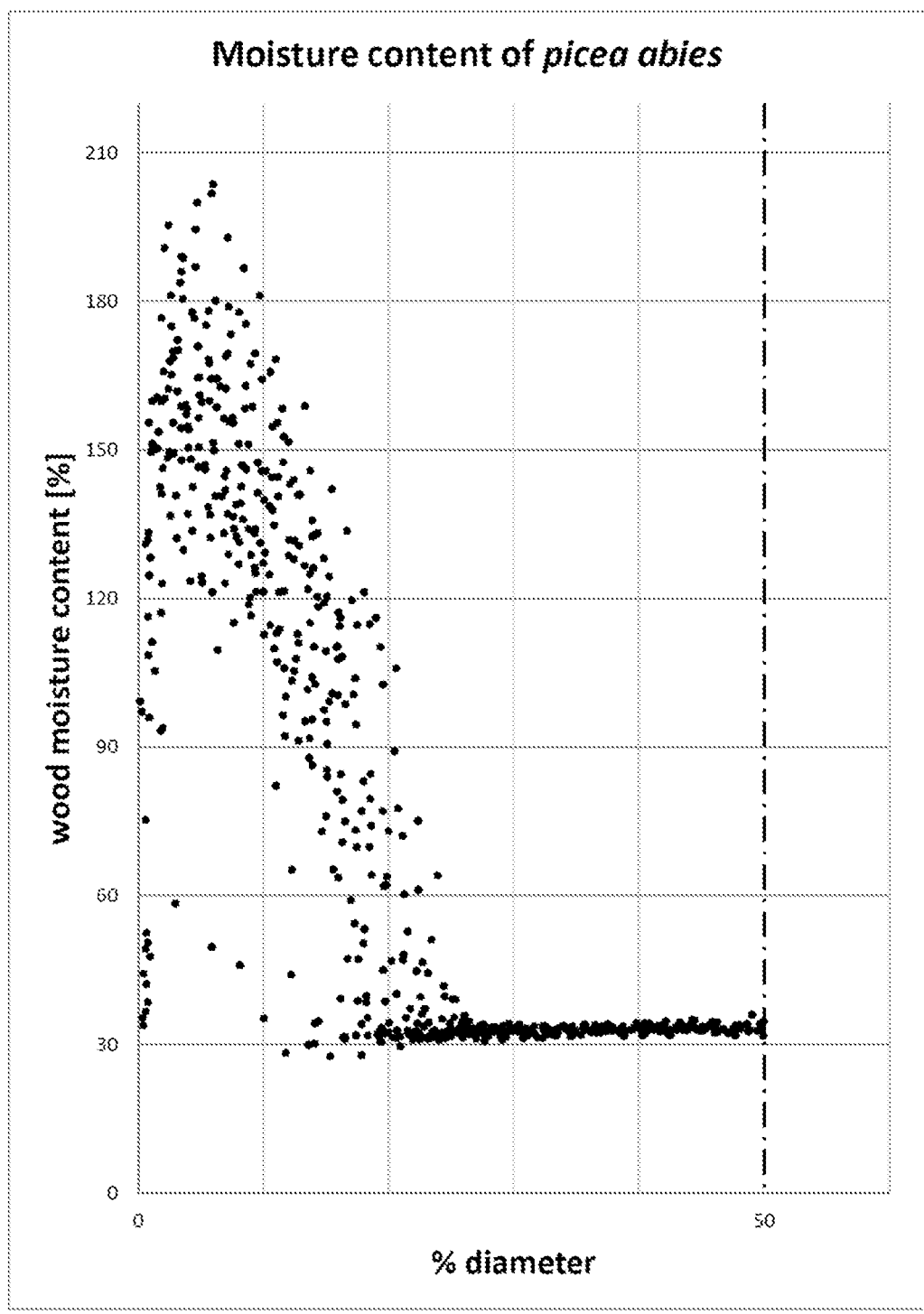

surface; d) bringing the dried surfaces together so that said glue surface touches the dried surface on the other wood piece, thus providing a wet glued wood article.

20 Claims, 6 Drawing Sheets

(51) Int. Cl.
| | |
|---|---|
| B32B 21/04 | (2006.01) |
| C09J 5/02 | (2006.01) |
| C09J 175/04 | (2006.01) |
| F26B 3/00 | (2006.01) |
| F26B 5/00 | (2006.01) |
| C09J 161/12 | (2006.01) |
| C09J 161/30 | (2006.01) |
| C09J 161/06 | (2006.01) |
| B32B 21/13 | (2006.01) |
| B32B 7/12 | (2006.01) |
| B32B 3/26 | (2006.01) |
| B32B 21/02 | (2006.01) |

(52) U.S. Cl.
CPC .............. *B32B 21/02* (2013.01); *B32B 21/04* (2013.01); *B32B 21/13* (2013.01); *C09J 5/02* (2013.01); *C09J 161/06* (2013.01); *C09J 161/12* (2013.01); *C09J 161/30* (2013.01); *C09J 175/04* (2013.01); *F26B 3/00* (2013.01); *F26B 5/00* (2013.01); *B32B 2250/02* (2013.01); *B32B 2307/7246* (2013.01); *B32B 2419/00* (2013.01); *B32B 2479/00* (2013.01); *C09J 2400/303* (2013.01); *C09J 2400/306* (2013.01); *C09J 2461/00* (2013.01); *C09J 2475/00* (2013.01)

(58) Field of Classification Search
CPC ........ B32B 2419/00; B27D 1/00; B27D 5/00; C09J 5/02; C09J 2400/303; C09J 2400/306; C09J 161/12; C09J 161/30; C09J 175/04; C09J 2461/00; C09J 2475/00; F26B 3/00; F26B 5/00; B29C 66/3464; B29C 66/0242; B27L 5/00
USPC ......................................................... 156/322
See application file for complete search history.

(56) References Cited

U.S. PATENT DOCUMENTS

| | | | | |
|---|---|---|---|---|
| 5,955,023 A | * | 9/1999 | Ioffe ..................... | B27N 3/002 |
| | | | | 264/109 |
| 6,007,659 A | | 12/1999 | Hasegawa | |
| 2014/0027020 A1 | * | 1/2014 | Klaeusler ................. | B27L 5/00 |
| | | | | 144/351 |

FOREIGN PATENT DOCUMENTS

| | | | | |
|---|---|---|---|---|
| CN | 104589429 A | 5/2015 | | |
| CN | 104760094 | 7/2015 | | |
| EP | 2132012 | 12/2009 | | |
| GB | 1164042 A | 9/1969 | | |
| JP | S4935505 A | 4/1974 | | |
| JP | S5532653 A | 3/1980 | | |
| JP | S57169581 | 10/1982 | | |
| JP | S5825901 A | 2/1983 | | |
| JP | H01238901 | 9/1989 | | |
| JP | H0440163 B2 | 7/1992 | | |
| JP | H11240001 A | 9/1999 | | |
| JP | 2001079805 A | 3/2001 | | |
| JP | 2004174990 A | 6/2004 | | |
| JP | 2007161991 | 6/2007 | | |
| JP | 2012206452 | 10/2012 | | |
| WO | WO-2008103055 A1 | * | 8/2008 | ............... C09J 5/06 |

OTHER PUBLICATIONS

International Search Report for PCT/IB2017/052111, dated Jun. 8, 2017.
Murphey, W.K. et al., "Feasibility studies on gluing of red oak at elevated moisture contents", Forest Products Journal, vol. 21, No. 8, 1971, pp. 56-59.
Sterley, M. "Characterisation of green-glued Wood adhesive bonds", Doctoral thesis, Linnaeus University School of Engineering, 2012.
Esping, B. "Grunder i trätorkning 1a", Graphic Systems AB, Gothenburg, 1992.
Strickler, M.D. "End gluing of green lumber", Forest Products Journal, vol. 20, No. 9, 1970, pp. 47-51.
Sterley, M. et al. "Edge and face gluing of green timber using a one-component polyurethane adhesive", Holz als Roh-und Werkstoff, 62(6), 2004, pp. 479-482.
Seft, John F. "Wood as a Construction Material", The Civil Engineering Handbook, Second Edition, 2003, Chapter 43.

* cited by examiner

METHOD FOR THE MANUFACTURE OF A WET GLUED WOOD ARTICLE

This application is a U.S. National Phase under 35 U.S.C. § 371 of International Application No. PCT/IB2017/052111, filed Apr. 12, 2017, which claims priority under 35 U.S.C. §§ 119 and 365 to Swedish Application No. 1650506-7, filed Apr. 15, 2016.

FIELD OF INVENTION

The present invention relates to a method for manufacturing a wet glued wood article, a wet glued wood article obtainable by said method and also uses of a wet glued wood article.

BACKGROUND

Freshly cut sawn goods are geometrically nearly perfect—in most cases profiled rectangular boards (the same is valid for other geometric shapes). The edges or faces are accurate enough, so that they can be glued together directly.

Through the kiln drying process the evenness of the faces is lost as certain areas of the board shrink at different rates to others. The results of these deformations are called cupping, bowing, twisting, etc. (see FIG. 4).

In order to dry-glue the kiln-dried pieces a lot of material has to be removed by planing, profiling, etc. in order to re-establish perfectly level faces and edges.

Figure 2:
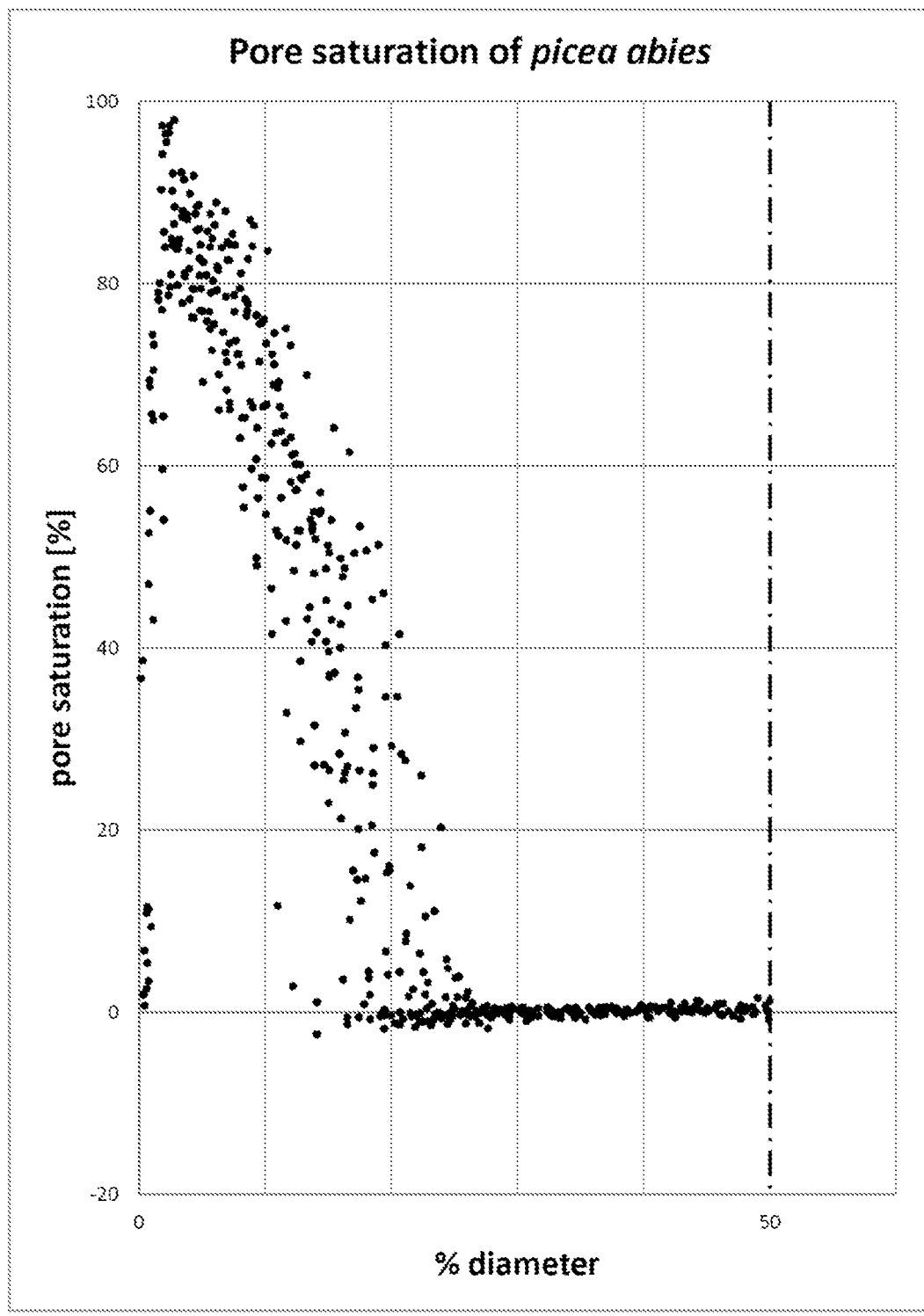

The transfer of wet-gluing into industrial processes has also been hampered by the fact that the initial moisture content of fresh sawn goods is very uneven (see FIGS. 1 and 2).

In the conventional sawing process there is no way to control the initial moisture content of the pieces. Typically one particular piece will have areas of high moisture content and other areas where the moisture content is low.

In CN104972537A it is disclosed a veneer process which involves a continuous melamine formaldehyde resin impregnated veneer drying glue delivery device. This may also be applied in other related technologies such as clamping, painting and other fields.

When it comes to wood moisture content it has also been disclosed in a product sheet that the whole wood material should have a certain level of moisture content (see TDS Loctite HB 5709 PURBOND_D).

When it comes to wood moisture content there is also a standard EN 386 "Glue laminated timber—Performance requirements and minimum production requirements" available. In this it is mentioned about "Manufacturing requirements" for the moisture content of the wood lamellae (i.e. "laminations").

It has now surprisingly been found that when doing research on wet gluing of solid wood it is possible to produce glue lines from wet gluing which are equally good compared to glue lines from dry gluing. The glue systems which were researched in the context of wet gluing (e.g. polyurethane glue (PUR), phenol- and resorcinol-formaldehyde (PF and RF), melamine-urea-formaldehyde (MUF), etc.) did show that they are very sensitive to high levels of free water and big variations of moisture content in general. As a result the wet gluing process with fresh sawn goods is unreliable and results in an unacceptable rate of faulty glue lines, which problem now has been alleviated or minimized or solved by the present invention.

This invention also provides a solution that alleviates or minimizes or solves the problem with the need of planing, profiling, etc. in order to re-establish perfectly level faces and edges in the context of dry gluing wood.

SUMMARY OF INVENTION

The present invention thus solves one or more of the above problems, by providing according to a first aspect a method for manufacturing a wet glued wood article comprising the following steps:
a) providing a first actively never-dried or slightly dried wood piece comprising at least one surface which has a superficial layer having a thickness of least 2-3 wood cells, preferably a freshly sawn wood piece,
b) drying the surface of said wood piece so that the moisture content of said superficial layer, preferably up to a depth of from about 0.1 mm to about 1 mm in said wood piece, is below the fibre saturation point, providing a dried surface on said first wood piece,
c) applying a gluing agent on said dried surface thus providing a glue surface,
d) providing a second actively never-dried or slightly dried wood piece comprising at least one surface which has a superficial layer having a thickness of least 2-3 wood cells, preferably a freshly sawn wood piece,
e) drying the surface of said second wood piece so that the moisture content of said superficial layer, preferably up to a depth of from about 0.1 mm to about 1 mm in said wood piece, is below the fibre saturation point, providing a dried surface on said second wood piece,
f) bringing said first and second dried surfaces together, so that said glue surface of the first wood piece touches said dried surface on said second wood piece, thus providing a wet glued wood article, and optionally
g) clamping said wet glued wood article for creating a minimal glued joint bridging said first and second wood pieces together.

Also provided according to a second aspect of the invention is a wet glued wood article obtainable by a method according to the first aspect.

Also provided according to a third aspect is use of the wet glued wood article according to the second aspect in building constructions or in furniture.

DETAILED DESCRIPTION OF THE INVENTION

It is intended throughout the present description that the expression "actively never-dried or slightly dried wood piece" embraces any wood piece which may be used in the context of the method according to the first aspect of the invention. Preferably said wood piece is a freshly sawn wood piece. It is also possible to use "reject material" from a kiln drying process aiming for providing material for glue-laminated products (such as Cross Laminated Timber, CLT) but is not fulfilling necessary moisture content criteria.

It is intended throughout the present description that the expression "gluing agent" embraces any gluing agent which may be used in the context of the method according to the invention. Preferably said gluing agent is selected from polyurethane glue (PUR), phenol- and resorcinol-formaldehyde (PF and RF) glue or melamine-urea-formaldehyde (MUF) glue or a combination thereof. Preferably a PUR glue (such as a PUR glue system) is used in the method according to the present invention.

According to a further preferred embodiment of the first aspect of the invention at least one surface of said first wood piece and at least one surface of said second wood piece is even. There could be up to four surfaces of said pieces that are even.

According to a further preferred embodiment of the first aspect of the invention said gluing agent of step c) is polyurethane glue (PUR), phenol- and resorcinol-formaldehyde (PF and RF) glue or melamine-urea-formaldehyde (MUF) glue, preferably a PUR glue.

According to a further preferred embodiment of the first aspect of the invention said depth in step b) is from about 0.15 to about 0.3 mm.

According to a further preferred embodiment of the first aspect of the invention said wood moisture content of the outermost layer in step b) and e) is from about 8 to about 30%, preferably from about 10 to about 25%, and most preferred from about 12 to about 15%.

According to a further preferred embodiment of the first aspect of the invention the drying time for the drying in step b) is less than 45 minutes, preferably less than 15 minutes and most preferred less than 10 minutes.

According to a further preferred embodiment of the first aspect of the invention said drying of step b) and e) is performed using convection drying, radiation drying, contact drying, chemical drying (which could be managed by applying a hydrophilic substance to remove free water quickly) or vacuum drying or combinations thereof.

According to a further preferred embodiment of the first aspect of the invention the convection drying involves conventional convection drying, jet drying or high temperature drying or combinations thereof, and the radiation drying involves infrared drying or high frequency drying, or combinations thereof.

According to a further preferred embodiment of the first aspect of the invention one or both wood pieces emanates from spruce, preferably Norway spruce (Picea Abies).

According to a further preferred embodiment of the first aspect of the invention the drying is performed under about 100° C., preferably under about 80° C.

According to a further preferred embodiment of the first aspect of the invention the drying is performed at from about 20° C. to about 100° C., preferably from about 20° C. to about 80° C. If using low-temperature air, e.g. at about or slightly above 20° C., it may have a low capacity of absorbing water vapor, but if using 100% fresh air which is preferred (instead of recirculating air), then this may be solved.

The purpose of the drying as set out above is not to make any chemical modification. Thermal decomposition of wood starts around 105° C., above 200° C. it accelerates significantly and reaches its peak around 275° C. The decomposition may manifest itself in that hemi-celluloses are converted into acetic acid, formic acid and furfural, etc. Thus preferably the maximum surface temperature (of the wood surfaces set out earlier) should be less than about 100° C.

According to a further preferred embodiment of the first aspect of the invention the gluing is performed at from about 20° C. to about 100° C., preferably from about 20° C. to about 80° C.

The process parameters (such as hot air temperature, air speed, drying time) may be varied to establish that the surface layer (ca. 0.2 mm thickness) is with a certain confidence level in a defined range of 8-30%, or 10 to 25%, or 12 to 15% moisture content. The drying time is preferably shorter than 10 minutes and the moisture content below the surface layer should preferably not be altered significantly. Aiming for a moisture content in the surface layer within a range of 8-30%, or 10 to 25%, or 12 to 15%, then the chemical reaction of the glue system (preferably one component polyurethane) would happen in a controlled way and the process would become reliable and safe.

The present invention is further generally applicable to overcome the difficulties with wet gluing. The gluing process according to the present invention takes place at the very surface of wooden boards—the penetration into the wooden structure depends on the glue-system, but is typically not very deep. With PUR glue systems (which are preferred) the penetration is in most cases only 2-3 cell rows (which convert into ca. 0.10-0.15 mm in Norway spruce). That superficial nature of the gluing process according to the present invention opens the possibility to combine the advantages of using wet sawn goods with the advantages of gluing at elevated moisture contents. The basic idea behind the present invention is to take freshly cut sawn goods (independent of the geometric shape) and dry the surface so that the moisture content of the outermost layer (approx. 0.2 mm) is safely below the fibre saturation point (FSP) (with Norway spruce the FSP is approx. 28%-34% m.c.). The sawn goods, to be used in the method of the first aspect of the present invention, may also be derived from other wood species. It is plausible to use any type of traded wood species in the context of the present invention. A list thereof is provided by the Botanic Gardens Conservation International (BCCI): http://www.bgci.org/news-and-events/news/1175/?sec=resources&option=com_news&id=1175

The title thereof is as follows: "The International Timber Trade: A working list of commercial timber tree species", Jennifer Mark et al, November 2014, Published by Botanic Gardens Conservation International Descanso House, 199 Kew Road, Richmond, TW9 3BW, UK.

Other lists with plausible wood species are found here:

https://en.wikipedia.org/wiki/List_of_woods
http://www.wood-database.com/

There are further as said many different technologies available to remove the water from wood: conventional convection drying, jet drying (i.e. high air speed), infrared drying, high frequency drying, etc. Conventional hot air drying may be possible (and also heat transfer through convection and infrared). Also high temperature drying (i.e. high air temperature) may be possible. The variables comprise air temperature and air speed. The thickness of the layer is of course also an important parameter (the layer-thickness may be 0.20 mm). There are also several possibilities to decrease the drying time; one obvious one may be to increase the air speed. Another possibility could be to give a "boost" through infrared panels.

Preferred features of each aspect of the invention are as for each of the other aspects mutatis mutandis. The prior art document(s) mentioned herein are incorporated to the fullest extent permitted by law. The invention is further described in the following examples, together with the appended figures, which do not limit the scope of the invention in any way. Embodiments of the present invention are described as mentioned in more detail with the aid of examples of embodiments, together with the appended figures, the only purpose of which is to illustrate the invention and are in no way intended to limit its extent.

FIGURES

FIG. 1 discloses measurements from 12 mature spruce trees and show clearly how uneven the moisture content in sapwood can be (moisture content spruce).

FIG. 2 discloses also measurements from 12 mature spruce trees and show clearly how uneven the moisture content in sapwood can be (pore saturation spruce). Both FIGS. 1 and 2 show the natural distribution of water in freshly felled Norway Spruce (from bark to pith)—both graphs are using the same set of data.

Wood moisture content:

$$u = \frac{m_u - m_0}{m_0} * 100 \ [\%]$$

u wood moisture content in %
$m_u$ mass in original state
$m_0$ mass in absolute dry state
Wood moisture content is a common measure in the wood products industry. It relates the mass of water in the original sample ($m_u$-$m_0$ to the mass of the absolute dry sample.

Pore saturation:

$$PS = \frac{m_u - m_F}{m_{max} - m_F} * 100 \ [\%]$$

PS pore saturation in %
$m_u$ mass in original state
$m_F$ mass at fiber saturation point
$m_{max}$ mass when 100% of cell lumen are filled with water
Pore saturation is a better measure when looking at the rate of free water in wood cells. It compensates the dependency on density which is an inherent flaw of wood moisture content.

Figure 3:
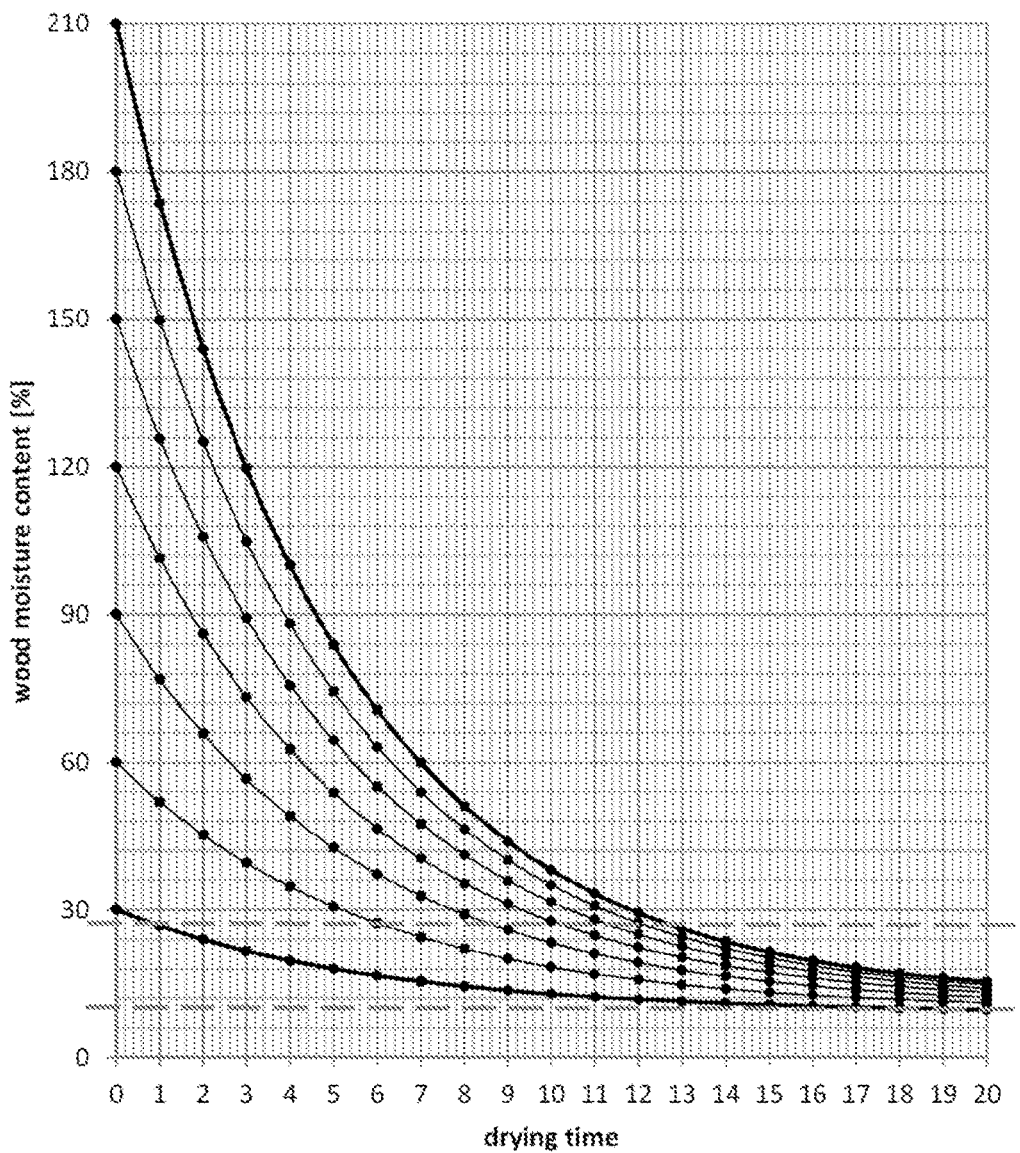

FIG. 3 shows the model for the surface layer drying.

Figure 4:
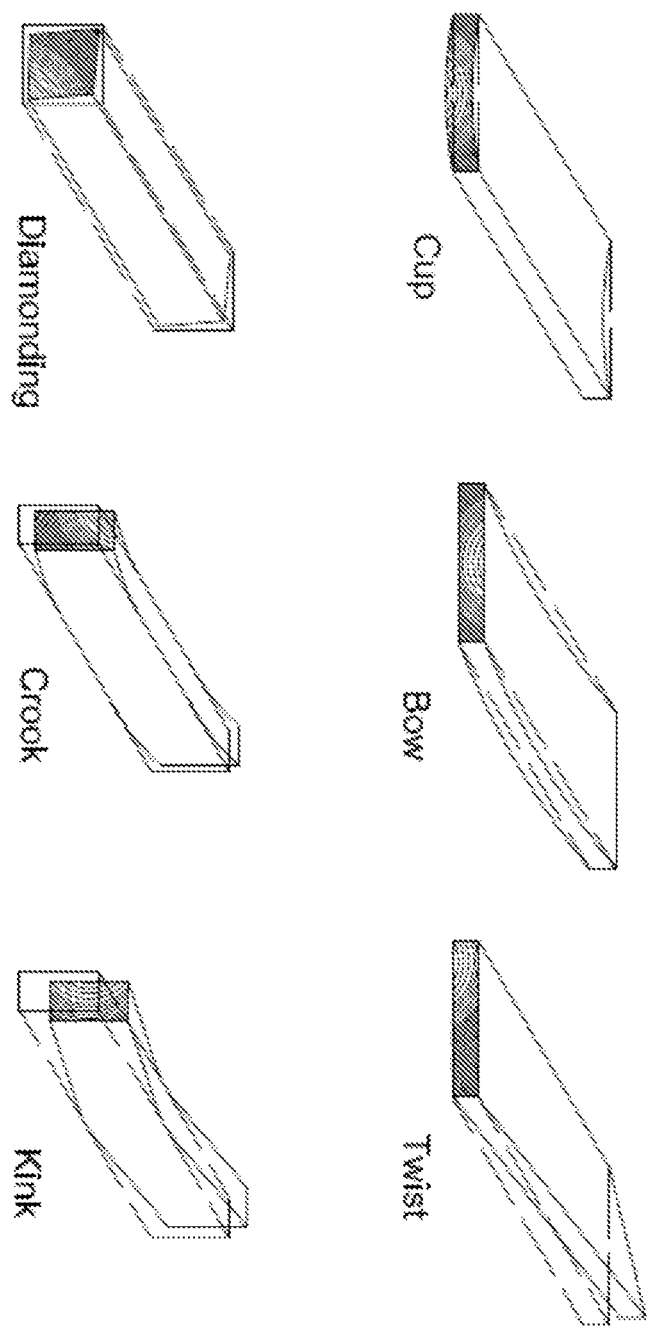

FIG. 4 discloses deformations through kiln-drying.

Figure 5:
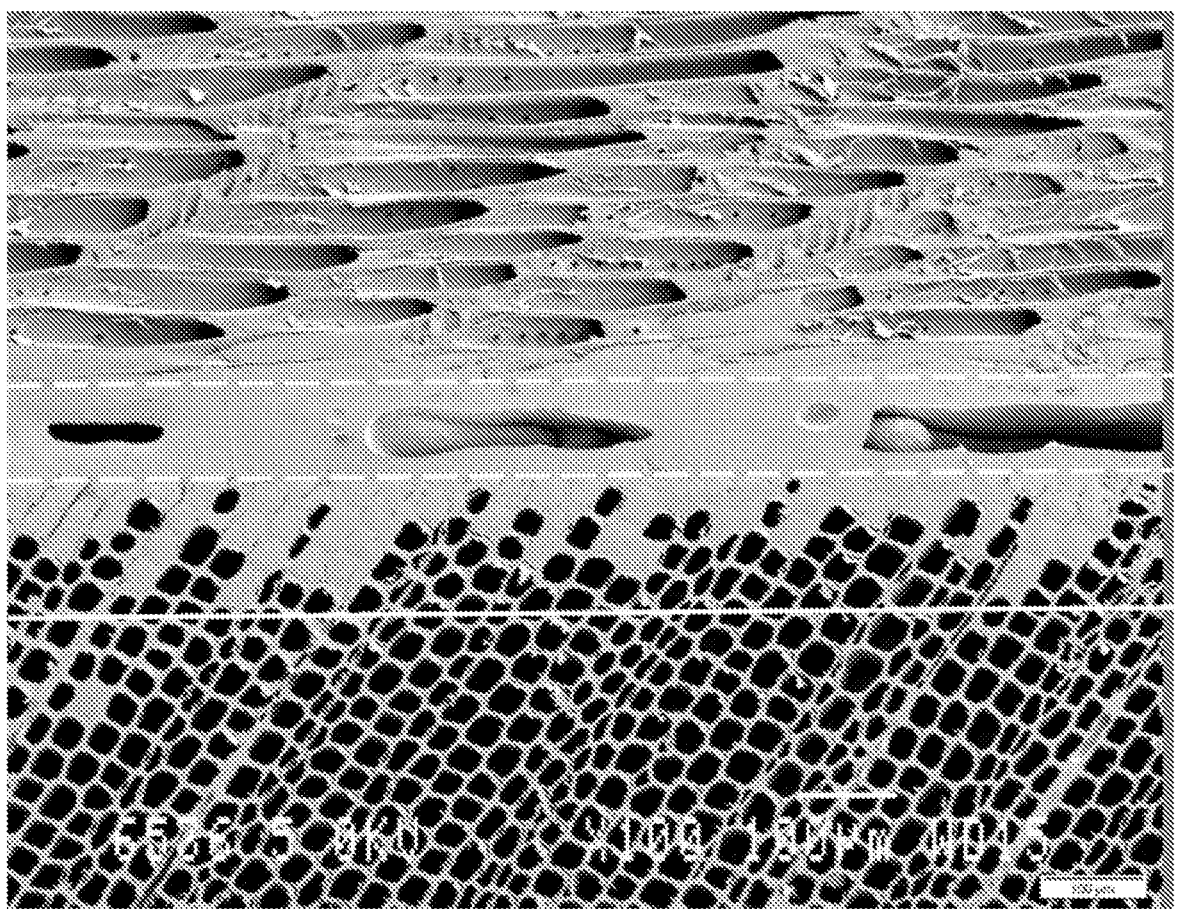
Figure 6:
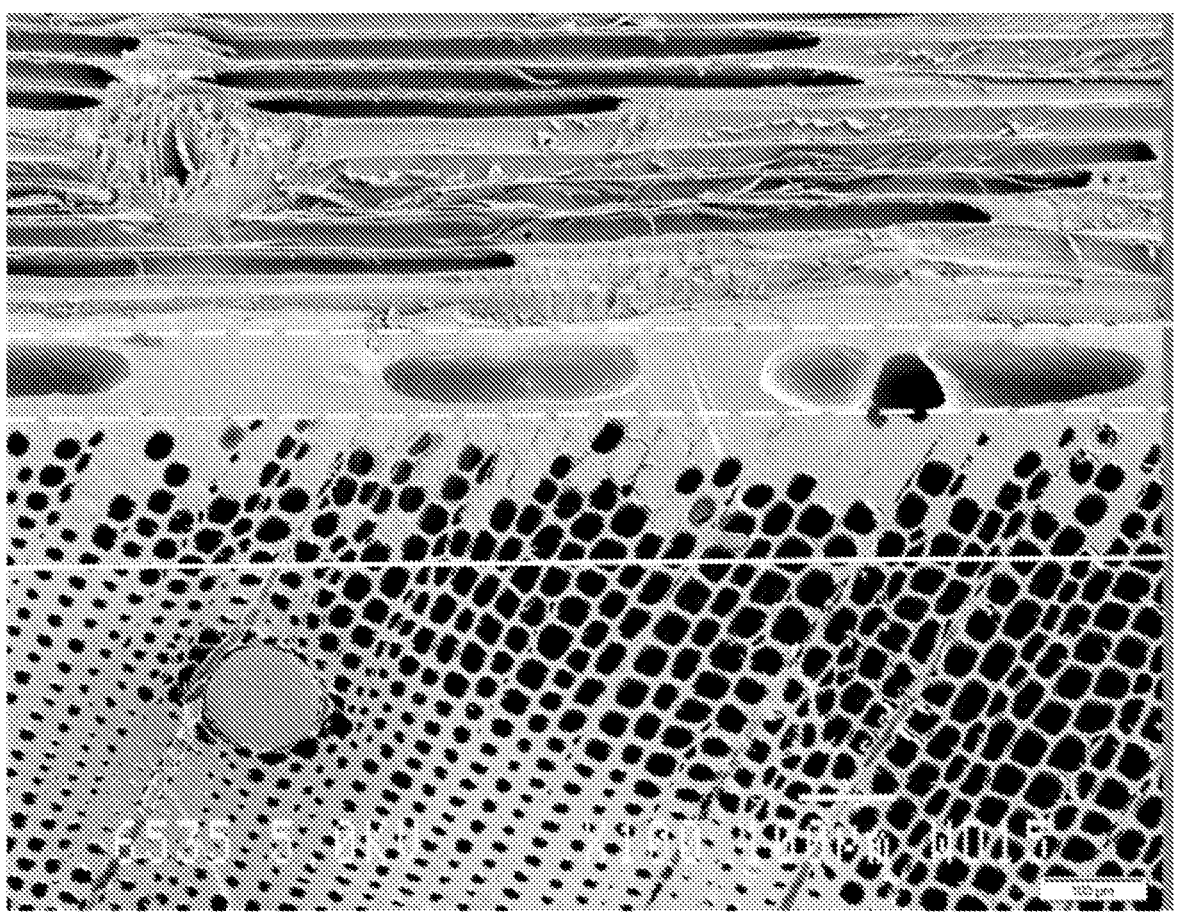

FIGS. 5 and 6 disclose that the gluing process according to the present invention takes place at the very surface of wooden boards—the penetration into the wooden structure depends on the glue-system, but is typically not very deep. With PUR glue systems the penetration is in most cases only 2-3 cell rows (which converts into approx. 0.10-0.15 mm). There are 3 lines in each figure whereby these lines indicate the thickness of the glue line (approx. 0.10 mm) and the maximum penetration of PUR into the wood-tissue (approx. 0.15 mm).

EXAMPLES

Example 1

One trial indicated the model for the surface layer drying (for results see FIG. 3). The dotted (grey; previously blue) lines indicate the target area (8-25%) for the wood moisture content. Depending on the initial value it takes different times to arrive in the target area.

Example 2

An additional trial indicated using the pretreatment wet gluing method according to the present invention the following results. FIGS. 5 and 6 discloses these and that the gluing process according to the present invention takes place at the very surface of wooden boards—the penetration into the wooden structure depends on the glue-system, but is typically not very deep. With PUR glue systems the penetration is in most cases only 2-3 cell rows (which converts into approx. 0.10-0.15 mm).

Various embodiments of the present invention have been described above but a person skilled in the art realizes further minor alterations, which would fall into the scope of the present invention. The breadth and scope of the present invention should not be limited by any of the above-described exemplary embodiments, but should be defined only in accordance with the following claims and their equivalents. For example, any of the above-noted methods may be combined with other known methods. Other aspects, advantages and modifications within the scope of the invention will be apparent to those skilled in the art to which the invention pertains.

The invention claimed is:

1. A method for manufacturing a wet glued wood article comprising the following steps:
   a. providing a first actively never-dried or slightly dried wood piece comprising at least one surface which has a superficial layer having a thickness of least 2 wood cells, wherein said wood piece is a freshly sawn wood piece,
   b. drying the at least one surface of said wood piece so that the moisture content of said superficial layer up to a depth of from 0.15 mm to 0 3 mm in said wood piece is below the fibre saturation point, providing a dried surface on said first wood piece, wherein the drying is performed at a temperature from 20° C. to 80° C. for less than 15 minutes,
   c. applying a gluing agent on said dried surface thus providing a glue surface, wherein the gluing agent is polyurethane glue (PUR),
   d. providing a second actively never-dried or slightly dried wood piece comprising at least one surface which has a superficial layer having a thickness of least 2 wood cells,
   e. drying the surface of said second wood piece so that the moisture content of said superficial layer is below the fibre saturation point, providing a dried surface on said second wood piece,
   f. bringing said first and second dried surfaces together, so that said glue surface of the first wood piece touches said dried surface on said second wood piece, thus providing a wet glued wood article and wherein the gluing is performed at a temperature from 20° C. to 80° C.,
   wherein said wood moisture content of said superficial layer in steps b) and e) is from 8 to 30%, and wherein the drying of steps b) and e) is performed using convection drying.

2. A method according to claim 1 wherein at least one surface of said first wood piece in step a) and at least one surface of said second wood piece in step d) are even.

3. A method according to claim 1 wherein one or both wood pieces emanate from spruce.

4. A method according to claim 1 wherein either or both the actively never-dried or slightly dried wood piece in step d) is a freshly sawn wood piece.

5. A method according to claim 1 wherein the drying time for the drying in step b) is less than 10 minutes.

6. A method according to claim 1 wherein said wood moisture content of said superficial layer in steps b) and e) is from 10 to 25%.

7. A method according to claim 1 wherein said wood moisture content of said superficial layer in steps b) and e) is from 12 to 15%.

8. A method according to claim 1 wherein the convection drying involves conventional convection drying, jet drying or high temperature drying or combinations thereof.

9. A method for manufacturing a wet glued wood article comprising the following steps:
   a. providing a first actively never-dried or slightly dried wood piece comprising at least one surface which has a superficial layer having a thickness of least 2 wood cells, wherein said wood piece is a freshly sawn wood piece,
   b. drying the at least one surface of said wood piece so that the moisture content of said superficial layer up to a depth of from 0.15 mm to 0 3 mm in said wood piece is below the fibre saturation point, providing a dried surface on said first wood piece, wherein the drying is performed at a temperature from 20° C. to 80° C. for less than 15 minutes,
   c. applying a gluing agent on said dried surface thus providing a glue surface, wherein the gluing agent is polyurethane glue (PUR),
   d. providing a second actively never-dried or slightly dried wood piece comprising at least one surface which has a superficial layer having a thickness of least 2 wood cells,
   e. drying the surface of said second wood piece so that the moisture content of said superficial layer is below the fibre saturation point, providing a dried surface on said second wood piece,
   f. bringing said first and second dried surfaces together, so that said glue surface of the first wood piece touches said dried surface on said second wood piece, thus providing a wet glued wood article, and
   g. clamping said wet glued wood article for creating a minimal glued joint bridging said first and second wood pieces together,
   wherein said wood moisture content of said superficial layer in steps b) and e) is from 8 to 30%.

10. A method according to claim 9 wherein said drying of step b) and e) is performed using convection drying, radiation drying, contact drying, chemical drying or vacuum drying or combinations thereof.

11. A method according to claim 10 wherein the convection drying involves conventional convection drying, jet drying or high temperature drying or combinations thereof.

12. A method according to claim 9 wherein the drying time for the drying in step b) is less than 10 minutes.

13. A method according to claim 9 wherein said wood moisture content of said superficial layers in steps b) and e) is from 10 to 25%.

14. A method according to claim 9 wherein said wood moisture content of said superficial layers in steps b) and e) is from 12 to 15%.

15. A method for manufacturing a wet glued wood article comprising the following steps:
   a. providing a first actively never-dried or slightly dried wood piece comprising at least one surface which has a superficial layer having a thickness of least 2 wood cells, wherein said wood piece is a freshly sawn wood piece,
   b. drying the at least one surface of said wood piece so that the moisture content of said superficial layer up to a depth of from 0.15 mm to 0 3 mm in said wood piece is below the fibre saturation point, providing a dried surface on said first wood piece, wherein the drying is performed at a temperature from 20° C. to 80° C. for less than 15 minutes,
   c. applying a gluing agent on said dried surface thus providing a glue surface,
   d. providing a second actively never-dried or slightly dried wood piece comprising at least one surface which has a superficial layer having a thickness of least 2 wood cells,
   e. drying the surface of said second wood piece so that the moisture content of said superficial layer is below the fibre saturation point, providing a dried surface on said second wood piece,
   f. bringing said first and second dried surfaces together, so that said glue surface of the first wood piece touches said dried surface on said second wood piece, thus providing a wet glued wood article,
   wherein said wood moisture content of said superficial layer in steps b) and e) is from 8 to 30%.

16. A method according to claim 15 wherein said drying of step b) and e) is performed using convection drying, radiation drying, contact drying, chemical drying or vacuum drying or combinations thereof.

17. A method according to claim 16 wherein the convection drying involves conventional convection drying, jet drying or high temperature drying or combinations thereof.

18. A method according to claim 15 wherein the drying time for the drying in step b) is less than 10 minutes.

19. A method according to claim 15 wherein said wood moisture content of said superficial layers in steps b) and e) is from 10 to 25%.

20. A method according to claim 15 wherein said wood moisture content of said superficial layers in steps b) and e) is from 12 to 15%.

* * * * *